United States Patent
Smith, Jr.

[15] 3,680,041

[45] July 25, 1972

[54] FILTERED COHERENT WAVE HOLOGRAPHY

[72] Inventor: Noyes D. Smith, Jr., Bellaire, Tex.

[73] Assignee: Shell Oil Company, New York, N.Y.

[22] Filed: Nov. 28, 1969

[21] Appl. No.: 880,579

Related U.S. Application Data

[63] Continuation-in-part of Ser. No. 659,084, Aug. 8, 1967.

[52] U.S. Cl. ............340/15.5 DP, 181/0.5 NP, 340/15.5 R, 340/15.5 CP, 350/3.5, 350/162 SF
[51] Int. Cl. .........................................................G01v 1/32
[58] Field of Search.............340/15.5 DP, 15.5 CP; 350/3.5, 350/162 SF

[56] References Cited

UNITED STATES PATENTS 3,400,363   9/1968   Silverman .......................340/15.5 X
3,484,740   12/1969  Cook ........................................350/3.5
3,503,037   3/1970   Smith, Jr. ............................340/15.5
3,532,407   10/1970  Upatnieks............................350/3.5

OTHER PUBLICATIONS

Geophysics Vol. XXXII, No. 6 (Dec. 1967) pp. 988– 1002. Digital Processing of Seismic Data, Daniel Silverman Primary Examiner—Benjamin A. Borchelt
Assistant Examiner—H. A. Birmiel
Attorney—J. H. McCarthy and Theodore E. Bieber

[57] ABSTRACT

A process for producing a hologram by illuminating an object with a coherent elastic wave is improved by digitally depicting the substantially full dynamic range of the mixture of reference wave energy and diffracted wave energy that forms the holographic data, subjecting the digitally depicted data to a low-pass spatial filtration, and displaying the hologram that is provided by the filtered data.

2 Claims, 4 Drawing Figures a)

b)

c)

INVENTOR:
NOYES D. SMITH, JR.

INVENTOR:
NOYES D. SMITH, JR.

3,680,041

FILTERED COHERENT WAVE HOLOGRAPHY

REFERENCE TO RELATED APPLICATIONS

The present application is a continuation-in-part of a copending application of N.D. Smith, Jr. filed Aug. 8, 1967, Ser. No. 659,084 entitled Holographic Seismic Exploration.

BACKGROUND OF THE INVENTION

Reflection seismology for the exploration of the sedimentary layers of the earth to great depths (15 to 20,000 feet) depends on the following properties of the rocks:
1. Various geological strata of interest have different acoustic impedances.
2. These variations are not too great and reflection coefficients are usually 0.01 or less and only in unusual cases reach 0.05 to 0.10.
3. Attenuation is sufficiently low for frequencies below 60 Hz that signals above noise can be recorded over path lengths of 40,000 feet.
4. At wave-lengths corresponding to these frequencies the layers are remarkably smooth and hence the layers reflect specularly.

The thickness of layering varies from very small, fractions of inch, to large statistically homogeneous layers of 50 feet or more. Averaged properties over thicknesses of the order of, for example, one-tenth of a wave-length, show contrasts with spatial wave-lengths, from one-tenth wave-length to several wave-lengths. Because of spherical spreading and attenuation, the ratio of the amplitudes of the first arrival refracted waves, trapped surface waves and direct waves to the deeply reflected wave amplitudes are in the range of 80 to 100 db.

The object of seismic surveying is to determine the geometry of the surfaces delineating changes in the elastic properties of the rocks so that the geological structure and structural history can be ascertained.

The advantages of seismic holography are as follows:
1. The wave arrival time—three dimensional volume data of normal seismic surveying is reduced to a three dimensional display of images of the source in reflectors and diffracting edges.
2. Signal-to-noise is improved since the coherent data are concentrated in space to the images.
3. The images are located in space equivalent to a constant velocity integration of the reflector space.

Problems which must be solved to make useful seismic holograms are as follows:
1. No recording medium is available with the necessary dynamic range to record useful seismic hologram directly as a transparency for optical reproduction. Hence means must be provided to reduce the range required to preserve the deeper weaker images.
2. The distortions due to irregular surface layers and topography must be corrected.
3. Because of the enormous difference between the seismic wavelengths (20–300 feet) for which the seismic hologram is recorded and the optical wavelengths ($10^{-6}$ feet) with which it is reproduced, large magnification of the vertical scale exist in the optical reproductions.

In the elastic half space for which the seismic hologram is recorded, the reflecting layers are closely spaced and hence the seismic images are frequently a fraction to a few wavelengths apart. By using a large reference signal the interference produced by closely spaced coherent images is essentially eliminated in the hologram. However, the coherent reconstructed images will produce interference fringes. If the vertical exaggeration is large, the fringes will be closely spaced and the overlapping of the many fringe systems will average to a background which will decrease the contrast but not obscure the images. However, if the images are close, broader fringes with greater contrast will exist.

BRIEF SUMMARY OF THE INVENTION

The object of this invention is to provide a method for reducing the dynamic range of the data that forms a seismic hologram so that a hologram comprising a transparency or replica can be prepared and can be viewed in coherent light to reconstruct a scaled image space in which the images from deep reflectors can be observed. The object of the present invention is accomplished by recording the seismic hologram digitally with full required dynamic range. These data are then processed on a digital computer to accomplish low-pass spatial filtering which eliminates or reduces the amplitude of the fringes produced by direct, surface and shallow reflected waves. In addition, the artifacts introduced by the geometry of the sampling pattern can also be removed.

Because of the large ratio of the amplitude of the signal along a direct path to a seismometer compared to the signals reflected a depth in the earth, sometimes as large as 80 to 100 db., it is not possible to record directly a seismic hologram on photographic or photochromic material which can be used to reconstruct the images from reflections at great depths. Also, the pattern of sampling of the seismic data that forms a hologram leads to unwanted diffraction patterns in the reconstructed image space. These difficulties are overcome by recording the seismic holographic data from a source of a coherent seismic wave and an areal array of seismic receiving stations digitally at full dynamic range as a function of position. Such seismic holographic data are a mixture of the seismic energy that is diffracted and reflected to each of the receiving stations with a reference wave signal having the frequency of the coherent wave at a phase corresponding to the location of the receiving station. In such seismic holographic data, the direct wave and shallow images produce interference fringes with a high spatial frequency. In a preferred embodiment of this invention, these data are fed into a digital computer in which the following sequence of computations is carried out:

1. The two-dimensional Fourier transform of the hologram is computed.
2. A low-pass spatial frequency filter is applied.
3. A spatial frequency filter rejecting the spatial frequencies produced by the sampling pattern is applied.
4. The filtered transform is again Fourier transformed to obtain a filtered hologram with limited dynamic range and with artifacts produced by the sampling pattern removed.
5. The data are suitably arranged and plotted as a transparency with blackening proportional to the intensity of the hologram at a suitably scaled position corresponding to the original position of the receiving seismometer. Such a hologram can now be reconstructed by illumination with coherent light and the weak images produced by deep reflectors will be visible.

BRIEF DESCRIPTION OF THE DRAWINGS

The invention will be more easily understood from the following detailed description of a preferred embodiment when taken in conjunction with the attached drawings in which:

In FIG. 1 a continuous source of elastic waves 1 is placed at the origin of a coordinate system with the $xy$ plane lying on the surface of an elastic half-space. A seismometer 2 at $x$ receives signals from image points 3 and 4. A reference wave voltage corresponding to a plane wave in the $xy$ plane is provided. Let $A_1$ be the amplitude of the direct wave and $A_2$ and $A_3$ the amplitudes of the image points. Let $A(x_1t)$ be the amplitude of the combined signals and reference at $x$. Then $a(x_1t) = (A_1/x) \sin(wt + kx) + (A_2/r_2) \sin(wt + kr_2) + (A_3/r_3) \sin(wt + kr_3) + A_R \sin Wt$ $a^2(x_1t) = (A^2/x^2) \sin^2(wt + ky) + (A_2^2/r_2^2) \sin^2(wt + kr_2) + (A_3^2/r_3^2) \sin^2(wt + kr_3) + A_R^2 \sin^2(wt) + 2A_R(A_1/x)\sin(wt + kx) \sin wt + aA_R(A_2/r_2)\sin(wt + kr_2) \sin wt + (2A_RA_3/r_3)\sin(wt + kr_3) + (2A_1A_2/xr_2) \sin(wt + kx)\sin(wt + kr_2) + (2A_1A_3/xr_3)\sin(wt + kx)\sin(wt + kr_3) + (2A_2A_3/r_2r_3)\sin(wt + kr_2)\sin(wt + kr_3)$.

Choose $A_R >> A_1, A_2, A_3$ so that terms not involving $A_R$ can be neglected. Average with respect to time. The resulting hologram is:

$H(x) = (A_R^2/2) + (A_RA_1/x)\cos kx + (A_RA_2/r_2)\cos kr_2 + (A_RA_3/r_3)\cos kr_3$. For purposes of illustration, FIG. 2a shows the variable part of the fringe system due to the direct. For 2b the fringe system due to image point 3 and 2c the fringe system due to image point 4 for the following values of the constants:

$A_1 = 100, A_2 = 10, A_3 = 1, A_R = 1000$
$K = (II/100)$, velocity = 6,060 feet per second
$Z_2 = 2,000$ feet, $Z_3 = 20,000$ feet.

The scales show the large range in amplitudes of the order of $10^4$ to 1.

Figure 1:
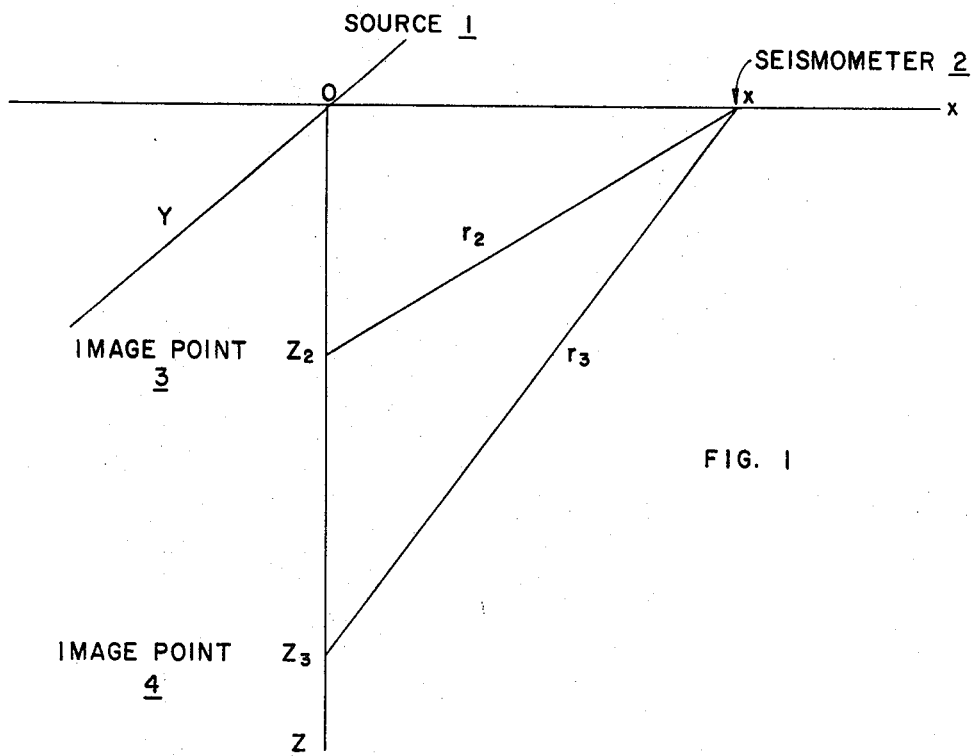
FIG. 1 is a simplified diagram showing a source, two image points and a receiving location.
Figure 2:
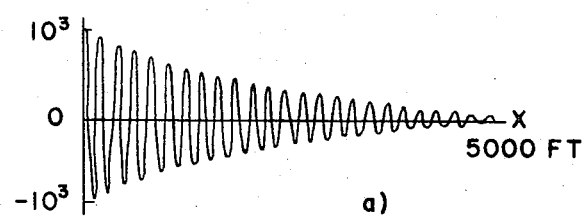
FIG. 2 shows schematically the holographic fringe system produced by the direct wave and the two image points and their relative amplitudes.
Figure 2:
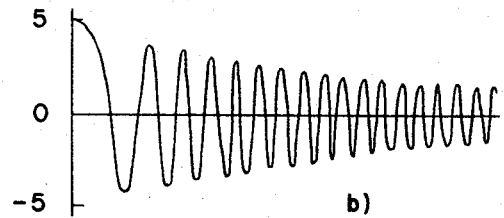
Figure 2:
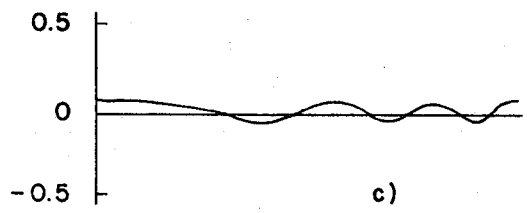

In FIG. 2 the difference between the spatial frequencies produced in the hologram by the surface waves and shallow reflections and those produced by deeper images is very apparent. By spatial filtering with a low-pass filter, the relative amplitudes can be made much more nearly equal. The resulting reduction in dynamic range permits the making of suitable transparencies for optical reconstruction containing observable images from large depths.

Figure 3:
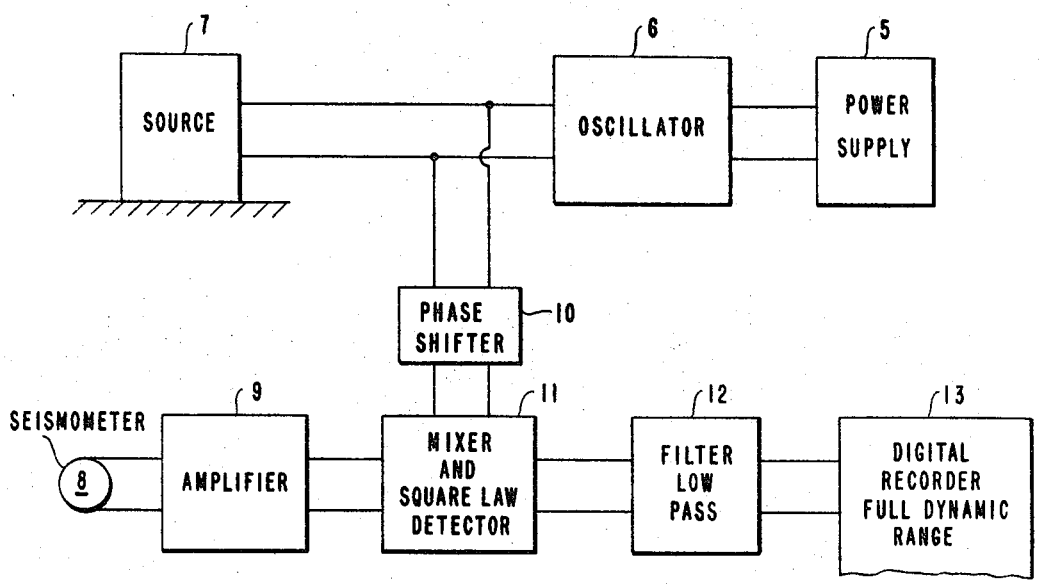
FIG. 3 shows a schematic arrangement for recording the seismic hologram.

FIG. 3 shows a schematic arrangement for acquisition of the data. Power supply 5 drives oscillator 6 which drives source 7. The resulting steady state signal at a sampling point is received by seismometer 8. The output of the seismometer amplified by amplifier is 9 introduced with a reference voltage from phase shifter 10 to the mixer and square-law detector 11. The resulting signal is low-pass filtered by 12 to remove second harmonics and recorded digitally with full dynamic range at 13. In addition to or instead of the low pass filter an integrating circuit may be used to eliminate the second harmonic and improve the signal-to-noise.

Figure 4:
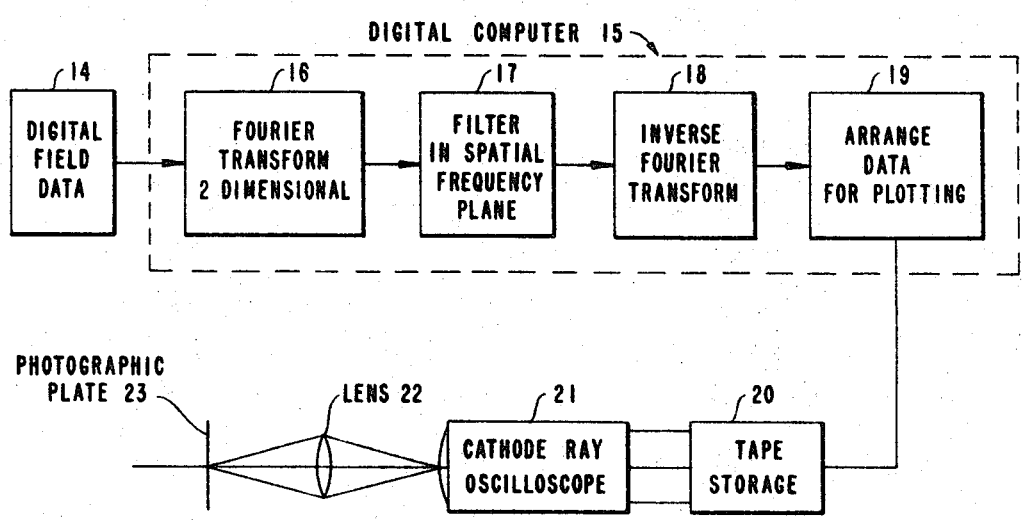
FIG. 4 shows block diagram indicating the sequence of computer operations necessary to prepare the data for making a scaled transparency of the seismic hologram with reduced dynamic range.

FIG. 4 shows a schematic block diagram of the process for converting the field data to a transparency. The field data on magnetic tape 14 is introduced to a digital computer 15 which has been programmed to carry out the following computations:

1. Two dimensional Fourier transform 16.
2. Low pass and band reject spatial filtering 17.
3. Inverse Fourier transform 18.
4. Sort and arrange data for plotting 19.
5. Data output stored on magnetic tape 20.

The data is presented to a cathode ray oscilloscope 21 the Z axis is modulated by the amplitude of the hologram at $x$ and $y$ axis positions corresponding to a scaled plot of the original sampling points. The face of the cathode ray tube is imaged by lens 22 onto photographic plate 23. After the exposure the plate is developed and fixed. The resulting transparency is a scaled hologram which can be viewed in coherent light to reconstruct a scale image space in which the images from great depths will be observable.

While reference has been made only to seismic holograms, it is intended to include all types of holograms where the full dynamic range can be recorded.

I claim as my invention:

1. A process for producing a hologram comprising
   illuminating an object with a coherent elastic wave, receiving diffracted and reflected waves at an array of areally spaced receiving locations, and mixing the waves received at each receiving location with a correspondingly phase-adjusted reference wave to provide a mixed signal;
   converting each of the mixed signals to a digital signal of full dynamic range;
   processing the digital signals in a manner simulating spatial filtering to remove the higher spatial frequencies by transforming the mixed digitized signal into a two-dimensional Fourier transform, spatially filtering the transform using both a low-pass spatial frequency filter and a spatial frequency filter arranged to reject the spatial frequencies produced by the sampling pattern and transforming the filtered transform to produce a signal relating to a filtered hologram with limited dynamic range and with the artifacts produced by the sampling pattern removed; and
   visibly displaying the pattern of the intensities of said filtered signals in an array corresponding to the array of receiving locations.

2. The process of claim 1 wherein the elastic wave is an acoustic seismic source and the receiving locations include seismometers.

* * * * *